(12) United States Patent
Conforti et al.

(10) Patent No.: US 6,322,149 B1
(45) Date of Patent: Nov. 27, 2001

(54) STRAP COVER AND POSITIONER

(75) Inventors: Carl J. Conforti, Tiverton, RI (US); Alma B. Bair, Medfield, MA (US)

(73) Assignee: The First Years Inc., Lake Forest, CA (US)

( * ) Notice: Subject to any disclaimer, the term of this patent is extended or adjusted under 35 U.S.C. 154(b) by 0 days.

(21) Appl. No.: 09/359,942

(22) Filed: Jul. 22, 1999

(51) Int. Cl.[7] ..................................................... B60R 22/10
(52) U.S. Cl. ........................................... 297/482; 297/483
(58) Field of Search .................... 297/482, 483, 297/484, 468

(56) References Cited

U.S. PATENT DOCUMENTS

| D. 316,792 | 5/1991 | Schmitz . | |
|---|---|---|---|
| 4,693,495 | * 9/1987 | LaPointe | 297/482 X |
| 4,832,367 | 5/1989 | Lisenby . | |
| 4,887,318 | * 12/1989 | Weinreb | 297/482 X |
| 5,161,258 | 11/1992 | Coltrain . | |
| 5,335,957 | 8/1994 | Golder . | |
| 5,573,306 | * 11/1996 | Galloway et al. | 297/482 |
| 5,839,793 | * 11/1998 | Merrick et al. | 297/484 |

FOREIGN PATENT DOCUMENTS

| 2845544 | * 4/1980 | (DE) | 297/482 |
|---|---|---|---|
| 3019378 | * 11/1981 | (DE) | 297/482 |
| 3434016 | * 6/1986 | (DE) | 297/482 |
| 1314645 | 8/1971 | (GB) . | |
| 2233878 | 1/1991 | (GB) . | |
| 2169187 | 7/1996 | (GB) . | |
| 234364 | 11/2000 | (GB) . | |
| 2182838 | * 5/1987 | (GB) | 297/482 |
| 50258 | * 3/1987 | (JP) | 297/482 |

OTHER PUBLICATIONS

Product Packaging, "Gerry, Adjust–A–Belt" Model 694, U.S. Pat. 4,832,367.
Product Packaging, "Safety 1st, Seat Belt Adjuster," Model No. 12106.
Product Packaging, "Blue Ridge International Products Company—SafeFit", Item No. 72512.

* cited by examiner

Primary Examiner—Peter R Brown
(74) Attorney, Agent, or Firm—Fish & Richardson P.C.

(57) ABSTRACT

An apparatus includes a strap cover adapted to receive a seat belt strap through a passage provided by the cover, the passage having a width that is smaller than a width of the seat belt to be received, at least a portion of the cover that is adapted to be disposed over an edge of the strap having a soft exterior surface, the cover including at least one pair of connectors adapted to selectively connect portions of the cover to enclose the seat belt.

32 Claims, 4 Drawing Sheets

STRAP COVER AND POSITIONER

BACKGROUND OF THE INVENTION

The invention relates to seat belt covering and positioning and in particular to an apparatus that can cover seat belts or other straps and position a shoulder strap for a child.

Infants are often placed in infant car seats when riding in a car. These infant car seats typically have three-point or five-point harness restraints in which seat belts or other apparatus such as buckles attach to the seat at three or five points, respectively. Usually the seat belts pass over the infant's torso, along either side of the infant's head and/or neck, and attach to the seat.

As infants grow into toddlers and small children, they no longer sit in car seats when riding in a car, sitting instead in the seats provided by the car. To secure the children in these seats, the children use the seat belts provided, which often include a lap belt and a shoulder strap.

SUMMARY OF THE INVENTION

In general, in one aspect, the invention features an apparatus including a strap cover adapted to receive a seat belt strap through a passage provided by the cover, the passage having a width that is smaller than a width of the seat belt to be received, at least a portion of the cover that is adapted to be disposed over an edge of the strap having a soft exterior surface, the cover including at least one pair of connectors adapted to selectively connect portions of the cover to enclose the seat belt.

Implementations of the invention may include one or more of the following features. The passage has a surface adapted to substantially prevent the cover from sliding relative to the strap when the surface is pressed against the strap. The passage surface includes a plurality of raised portions adapted to provide a high coefficient of static friction. The coefficient of static friction is sufficiently high such that the cover will remain substantially stationary relative to the strap despite forces tending to move the cover along a length of the strap ordinarily encountered when driving when the strap is a seat belt received by the passage and the passage surface is pressed against the strap by securing a person in a seat using the seat belt. The coefficient of static friction provided by the raised portions is substantially the same in both directions along the passage. The cover is adapted to be folded along a fold line. The width of the passage is between approximately 70% and approximately 97% of the width of the seat belt to be received. The pair of connectors provide one end of the width of the passage when coupled together. The cover includes a pair of connectors adapted to be selectively coupled such that the passageway is selectively enclosed.

The apparatus can also include a second strap cover adapted to receive a second seat belt strap, similar to the first-mentioned seat belt strap, through a second passage provided by the second cover similar to the first-mentioned passage provided by the first-mentioned cover, the second passage having a width that is smaller than a width of the second seat belt to be received, at least a portion of the second cover that is adapted to be disposed over an edge of the strap having a soft exterior surface, the second cover including at least one pair of connectors adapted to selectively connect portions of the second cover to enclose the second seat belt.

In general, in another aspect, the invention features a combination shoulder strap positioner and seat belt cover system including multiple strap covers each having an interior surface adapted to provide an opening sized to receive a seat belt strap, the opening having a width that is smaller than a width of the seat belt to be received, each cover including a pair of connectors adapted and disposed to couple to each other to selectively enclose the seat belt.

Implementations of the invention may include one or more of the following features. Each strap cover includes an elastomeric material adapted to engage the strap received in the opening to inhibit the cover from sliding along a length of the strap. The pair of connectors are adapted to pivotally couple to each other.

In general, in another aspect, the invention features a combination shoulder strap positioner and seat belt cover system including multiple substantially rectangular strap covers each including tabs extending from the short edges of the covers, the covers including a soft exterior surface and adapted to be folded along a fold line such that an interior surface of the cover provides an opening for receiving a seat belt, the opening having a width smaller than a width of the seat belt to be received, the interior surface including a plurality of elastomeric bumps adapted to engage the seat belt received by the opening, each cover further including a plurality of connector pairs with one connector in each pair disposed a similar distance from, and on opposite sides of, the fold line, a first pair of connectors disposed a distance approximately 70–97% of the width of the seat belt to be received by the opening and adapted to couple to each other, a second pair of connectors disposed in the tabs and adapted to couple to each other.

Various embodiments of the invention may provide one or more of the following advantages. Apparatus can adapt to an infant and a toddler or small child, providing a "grow with me" product. Harsh edges of seat belts or other straps can be inhibited or prevented from rubbing on an infant's or child's head or neck. Soft, comfortable head support can be provided for an infant in a car seat. A shoulder strap can be positioned for safe, comfortable, and convenient use for a child in a car's seat.

Other features and advantages of the invention will be apparent from the following drawings, detailed description, and claims.

DESCRIPTION OF PREFERRED EMBODIMENTS

The invention provides a system that can "grow" with a child from an infant to a toddler or small child. For an infant, the system can be used to shield the infant from uncomfortable strap edges such as those of seat belts in infant car seats. For a toddler or small child, the system can be used to position a shoulder strap of a three-point adult seat belt arrangement so that the shoulder strap comfortably and safely extends across the child's torso away from the child's neck.

Figure 1:
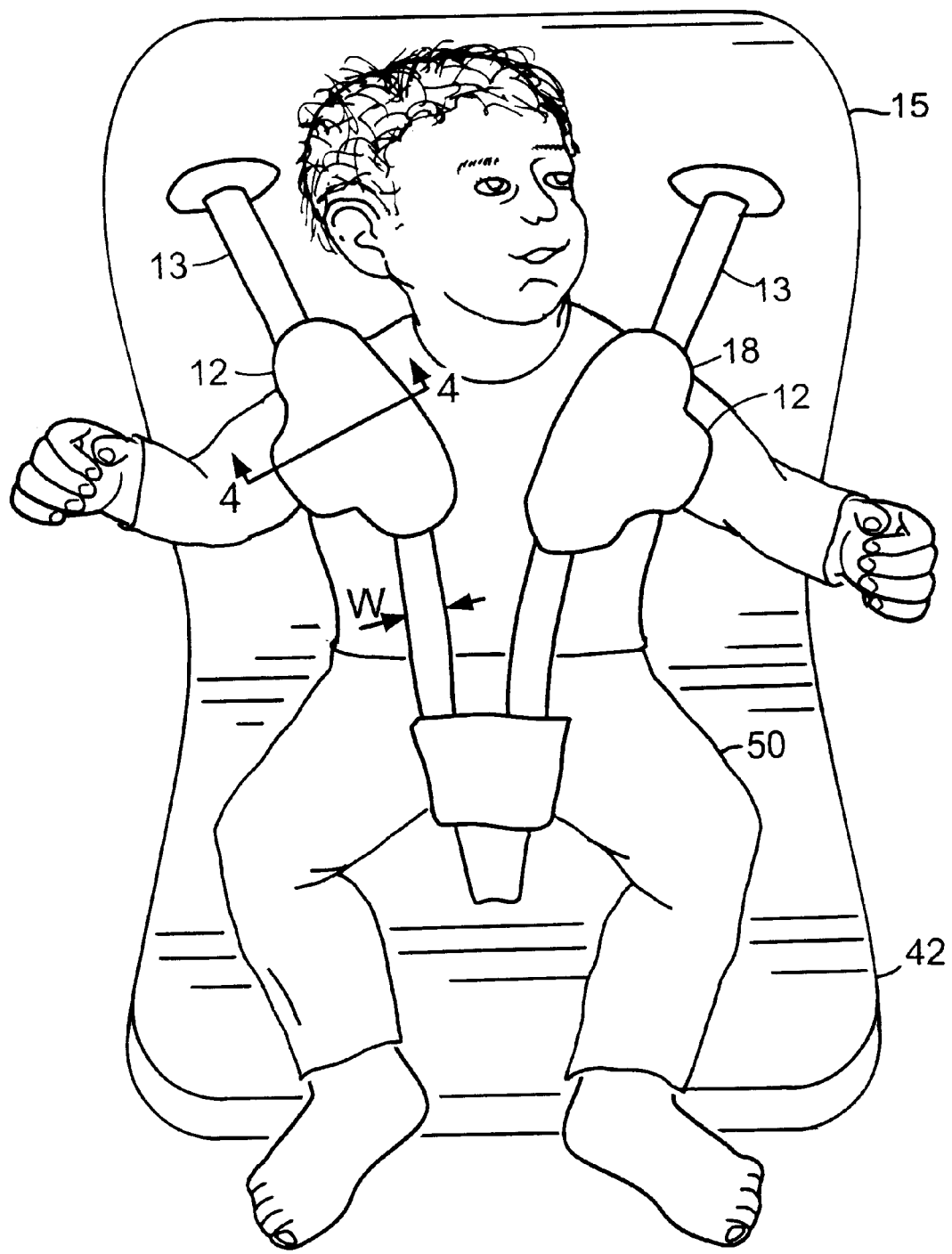
FIG. 1 illustrates two strap covers of a strap cover and positioner system in a strap cover configuration.
Figure 2:
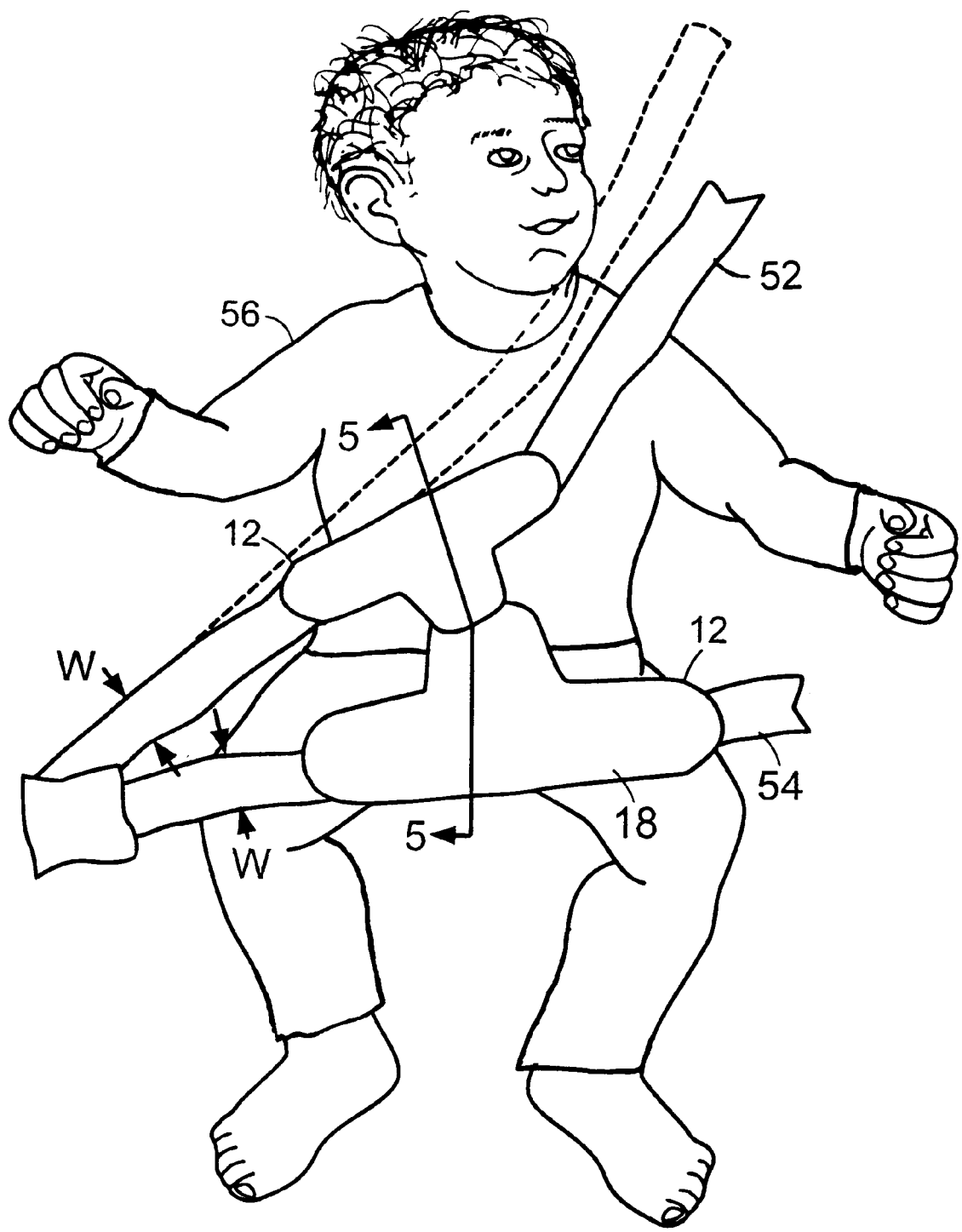
FIG. 2 illustrates the system shown in FIG. 1 in a strap positioner configuration.

As shown in FIGS. 1–2, a strap cover and positioner system 10 includes two strap covers 12. The covers 12 are identical in configuration, although this is not required. These covers 12 can be attached to straps such as seat belts 13 of an infant car seat 15 in a strap cover configuration shown in FIG. 1 or to seat belts 52 and 54 of a car's seat (not shown) in a strap positioner configuration shown in FIG. 2. Note that in the strap positioner configuration, the covers 12 also provide strap cover functions.

Figure 3:
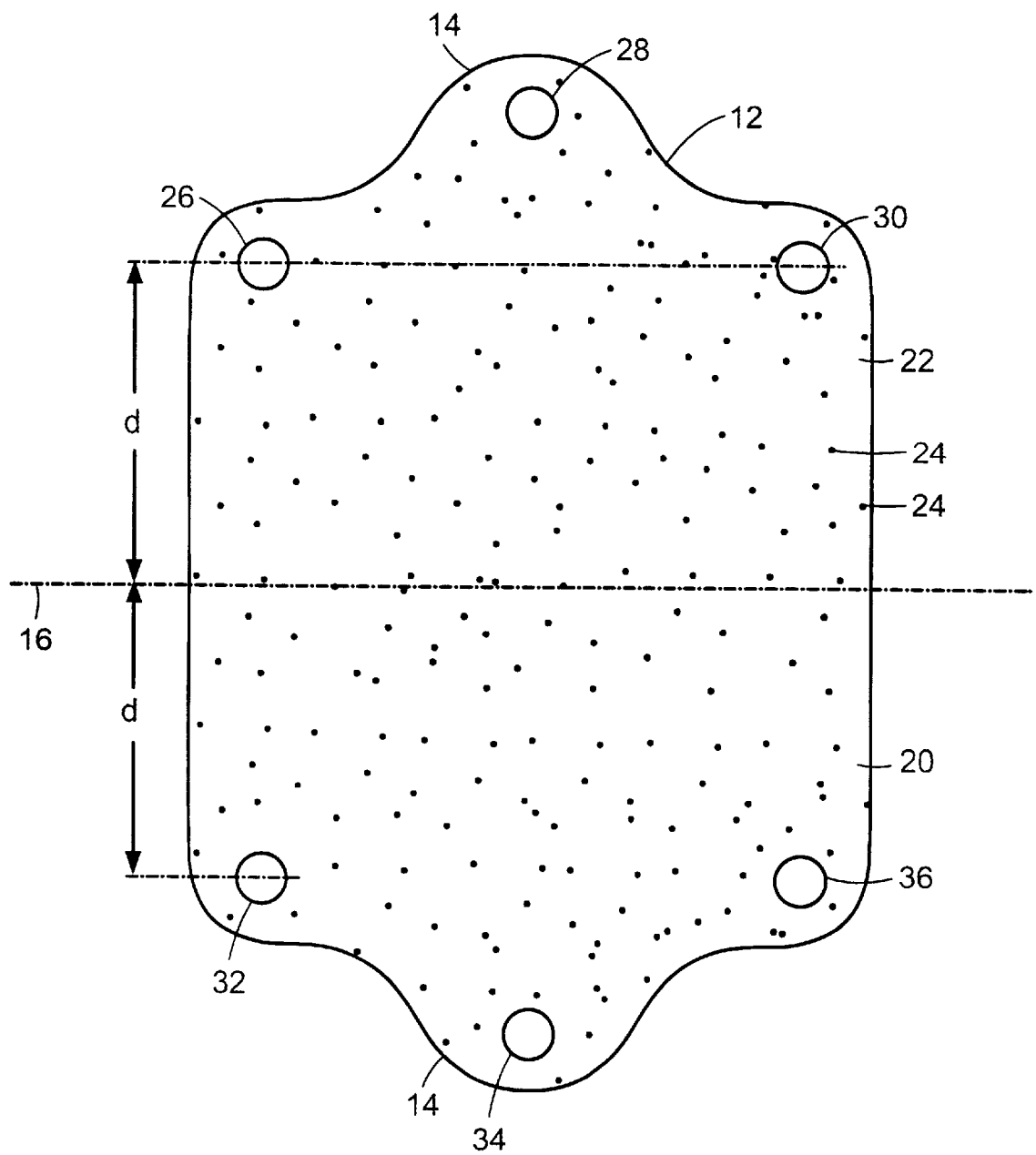
FIG. 3 shows one of the strap covers of the system shown in FIG. 1 in an open, flat state.

Referring also to FIG. 3, each cover 12 has a substantially rectangular shape when opened, with extended portions or tabs 14 at either end. The cover 12 is symmetric about a center line 16.

The cover 12 is made of flexible fabrics. An outside surface 18 of the cover 12 is made of soft, cotton, terry cloth that is pleasing to contact with skin. A stitched piping border (not shown) can be provided to provide a wear-resistant edge and to connect the outside surface material to the material for an inside surface 20 of the cover 12, enclosing a padding (not shown) such as foam between the outside surface 18 and the inside surface 20. The inside surface 20 is made of woven polyester fabric 22.

The inside surface 20 of the cover 12 includes elastomeric, e.g., polyvinyl chloride (PVC), bumps 24 bonded or molded onto the polyester 22. As shown, the bumps 24 are substantially hemispherically-shaped and regularly spaced in a grid of rows and columns, although a random arrangement of the bumps 24 is acceptable. The bumps 24 can have a higher coefficient of static friction than the polyester 22 and are adapted to frictionally engage a seat belt made of, e.g., woven nylon, to inhibit sliding of the cover 12 relative to the seat belt when the cover 12 is closed around the seat belt as described below.

The inside surface 20 also includes several connectors, here six connectors of three mating pairs. Connectors 26, 28, and 30 are disposed on one side of the center line 16 near the periphery of the cover 12. Connectors 32, 34, and 36 are disposed on the opposite side of line 16 substantially equal distances from the line 16 as connectors 26, 28, and 30 respectively. The connectors 26, 28, 30, 32, 34, and 36 are adapted such that connectors 26 and 32, 28 and 34, and 30 and 36, respectively, mate with each other. For example, the connectors in each pair can be male and female snaps as shown, or, e.g., hook and loop, button and button hole.

Figure 4:
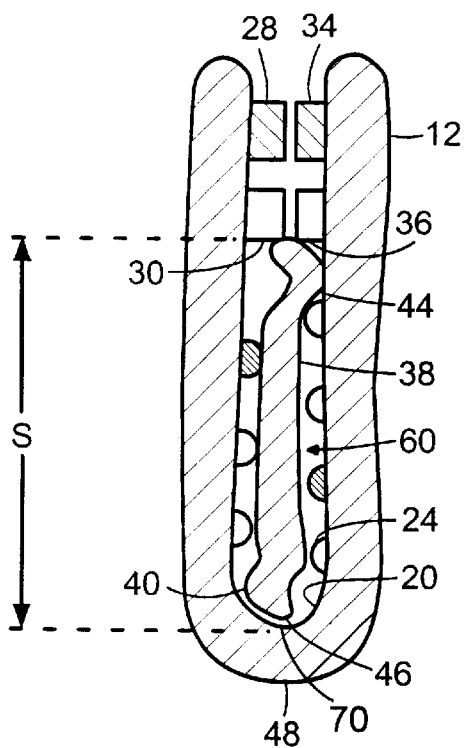
FIG. 4 is a cross-sectional view of one of the covers of the system shown in FIG. 1 in a closed state, covering a strap, taken along line 4—4 shown in FIG. 1.
Figure 5:
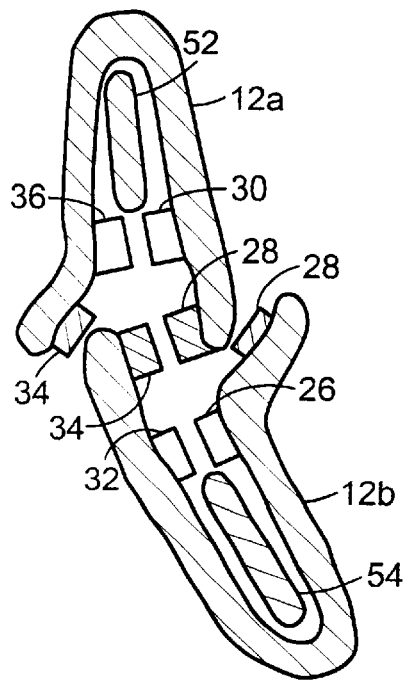
FIG. 5 is a cross-sectional view of the system shown in FIG. 2 in the strap positioner configuration taken along line 5—5 shown in FIG. 2.

The connectors 26, 28, 30, 32, 34, and 36 are configured and located to help couple multiple covers 12 together and to properly receive a seat belt. The connectors 28 and 34 are disposed in the tabs 14 of the cover 12 and are adapted to pivotally couple to each other. Multiple covers 12 can be configured identically, so that the connector 28 of one cover will mate with and couple to the connector 34 of another cover 12, as shown in FIG. 5. Alternatively, two differently configured covers 12 can be used, one without connector 28 and the other without connector 34. Preferably, however, both covers 12 are identical, which allows the tabs 14 to be coupled (as shown in FIG. 4) to prevent the tab 14 (if each cover 12 only had one tab 14) from hanging unattached. Referring also to FIG. 4, the connectors 26, 30, 32, and 36 are displaced from the line 16 a distance d. When the cover is folded as shown in FIG. 4, a bottom 70 of the inside surface 20 is displaced from a bottom of the connectors 30 and 36 shown in FIG. 4 or 26 and 32 (not shown in FIG. 4) a distance s, which is the width of a passage 60 provided by the folded cover 12. The cover 12 is configured such that the width s of the passage 60 is less than a width w (FIGS. 1–2) of a strap (e.g., a seat belt 38) to be received in the passage 60. Preferably, the width s is approximately 70%–97% of the width w. For example, typical values for the width w are within the range 1.75–2.25 in. and the spacing d is approximately 1.6–1.7 in. including some compression of the thickness of the cover 12. The selection of the spacing d helps ensure that when the cover 12 is closed around the seat belt 38, the bumps 24 engage the seat belt 38.

The covers 12 can be assembled as follows. The PVC bumps 24 are bonded or molded onto woven polyester. Material may be purchased that already includes the bumps 24 on the polyester. The outside and inside surfaces 18 and 20 are cut to the desired shape from terry cloth and the woven polyester with PVC bumps, respectively. The connectors are located as desired and attached to the interior surface 20. A padding is placed between the surfaces 18 and 20. The piping is sewn onto the periphery of the surfaces 18 and 20 to bind them together, enclosing the padding.

In operation, one or more covers 12 can be attached to one or more corresponding seat belts in a strap cover configuration as shown in FIG. 1. As shown, the covers 12 are placed on seat belts 40 in an infant carrier or car seat 42. The seat belts 40 are partially folded to accommodate their widths s within the smaller widths s of the passages 60 provided by the covers 12. The covers 12 are connected by snapping connectors 26, 28, and 30 to 32, 34, and 36, respectively, to enclose the seat belts 40 as shown in FIG. 4. Edges 44, and 46 of the seat belts 40 are covered by the connectors 26, 28, 30, 32, 34, and 36 and by the fabric of the cover 12, respectively. The covers 12 are arranged such that a bend 48 in the cover 12 is positioned on the edge 46 of the seat belt 40 nearer to an infant 50 in the infant car seat 42. Thus, the soft outside surface 18 will contact the infant 50 instead of the edge 46 of the seat belt 40. In this position, the covers 12 also provide support for the infant's head.

Also, as shown in FIGS. 2 and 5, two covers 12a, 12b can be used to position a shoulder strap of a seat belt arrangement that includes a shoulder strap 52 and a lap belt 54. The cover 12a is coupled around a shoulder strap 52 and the cover 12b is coupled around a lap belt 54 in a fashion similar to that described above, by snapping connectors 26 and 30 to connectors 32 and 36, respectively. The connector 28 of the cover 12a is snapped to the connector 34 of the cover 12b, and the connectors 34 of the cover 12a and 28 of the cover 12b are left unsnapped. The covers 12a, 12b are positioned along the lengths of the shoulder strap 52 and lap belt 54 either before or after enclosing the strap 52 and belt 54, but preferably before securing a child 56 into the seat using the strap 52 and belt 54. Depending on the relative locations of the covers 12a, 12b along the lengths of the strap 52 and belt 54, the angle between the covers 12a, 12b, varies and is accommodated by the pivoting connection of connectors 28 and 34. The covers 12a, 12b are positioned such that the shoulder strap 52 traverses the torso of a child 56 and runs over the child's shoulder, but does not rub against the child's neck. Without using the covers 12a, 12b, the shoulder strap 52 may uncomfortably and dangerously traverse across or near the child's neck as indicated in dashed lines in FIG. 5.

In either configuration, the covers 12 are configured to stay in place on the seat belt 40, the shoulder strap 52, and the lap belt 54. The description below refers only to the cover 12 and the belt 40 shown in FIG. 5, but the description applies equally well to the covers 12a, 12b and the strap 52 and the belt 54. At least some of the bumps 24 engage the seat belt 40, with the bumps 24 inhibiting the cover 12 from sliding along the length of the belt 40 due to the high coefficient of static friction provided by the bumps 24 and/or to the physical interaction of the bumps 24 with the texture of the belt 40. The coefficient of static friction provided by the bumps 24 is substantially the same for each bump 24, and substantially the same in all directions in a plane tangent to the bumps' peak, or at least in either direction along the passage 60 provided by the cover 12 in which the belt 40 is enclosed. The cover 12 is substantially prevented from sliding on the belt 40 when the cover 12 encloses the belt 40 and especially when the cover 12 is sandwiched between the infant's body and the belt 40. In this position, the infant's body and the belt 40 squeeze the cover 12 such that typical forces, e.g., due to the infant moving or vibrations from a car, tending to move the cover 12 along the length of the belt 40 are insufficient to do so. With the covers 12 closed around seat belts, the covers 12 can be slid along the lengths of the seat belts in either direction. The covers 12, however, are inhibited from sliding on the seat belts such that typical forces, e.g., vehicle vibrations, are insufficient to move the covers 12 on the seat belts when positioned as desired. The combination of materials and configuration of the covers 12 helps maintain the positions of the covers 12 on the seat belts.

Other embodiments are within the scope and spirit of the appended claims.

What is claimed is:

1. An apparatus comprising:

a first strap cover adapted to receive a first section of a seat belt strap through a first passage provided by the cover, the passage having a width of between about 1.6 and 1.7 inches, selected to be smaller than a width of the seat belt strap, at least a portion of the cover that is adapted to be disposed over an edge of the strap having a soft exterior surface, the cover including at least one pair of connectors adapted to selectively connect portions of the cover to enclose a first section of the seat belt; and a second strap cover adapted to receive a second section of the seat belt strap through a second passage provided by the second cover, at least a portion of the second cover having a soft exterior surface;

the first and second strap covers having connectors for releasably coupling the strap covers to each other to relatively position their seat belt strap sections.

2. The apparatus of claim 1 wherein the first passage has a surface adapted to substantially prevent the first strap cover from sliding relative to the strap when the surface is pressed against the strap.

3. The apparatus of claim 1 wherein the first strap cover passage surface includes a plurality of raised portions adapted to provide a high coefficient of static friction.

4. The apparatus of claim 3 wherein the coefficient of static friction provided by the raised portions is substantially the same in both directions along the first passage.

5. The apparatus of claim 1 wherein the first strap cover is adapted to be folded along a fold line.

6. The apparatus of claim 1 wherein the width of the first passage is between approximately 70% and approximately 97% of a width of a seat belt strap.

7. The apparatus of claim 1 wherein the first and second strap covers are adapted to be releasably coupled together with the first strap cover positioned about a shoulder strap and the second strap cover positioned about a lap belt, to position the shoulder strap away from the neck of a child secured by the seat belt.

8. The apparatus of claim 1 wherein the first and second strap covers are of identical structure.

9. A combination shoulder strap positioner and seat belt cover system comprising a plurality of strap covers each including tabs extending from edges of the covers, the covers adapted to be folded along a fold line such that an interior surface of the cover provides an opening for receiving a seat belt, each cover further including a plurality of connector pairs with one connector in each pair desposed a similar distance from, and on opposite sides of, the fold line, a fiest pair of connectors disposed a distance approximately 70 to 97 percent of a width of a seat belt of between about 1.75 and 2.25 inches in width and adapted to couple to each other, a second pair of connectors disposed in the tabs and adapted to couple to each other.

10. The combination system of claim 9, wherein the covers have soft exterior surfaces.

11. The combination system of claim 9, wherein the covers are substantially rectangular, with the tabs extending from short edges of the covers.

12. The combination system of claim 9, wherein the interior surface includes a plurality of elastomeric bumps adapted to engage a seat belt received within the opening.

13. The combination system of claim 9, wherein the strap covers are adapted to be releasably coupled together with one strap cover positioned about a shoulder strap and another strap cover positioned about a lap belt, to position the shoulder strap away from the neck of a child secured by the seat belt.

14. In combination, a seat belt having a nominal width;

a first strap cover adapted to receive a first portion of the seat belt through a first passage provided by the cover, the passage having a width that is smaller than the nominal width of the seat belt, at least a portion of the cover that is adapted to be disposed over an edge of the strap having a soft exterior surface, the cover including at least one pair of connectors adapted to selectively connect portions of the cover to enclose the first portion of the seat belt; and a second strap cover adapted to receive a second portion of the seat belt through a second passage provided by the second cover, at least a portion of the second cover having a soft exterior surface;

the first and second strap covers having connectors for releasably coupling the strap covers to each other to reletively position their seat belt strap sections.

15. The combination of claim 14 wherein the first passage has a surface adapted to substantially prevent the first strap cover from sliding relative to the seat belt when the surface is pressed against the seat belt.

16. The combination of claim 14 wherein the first passage is defined by a surface of the first strap cover that includes a plurality of raised portions adapted to provide a high coefficient of static friction.

17. The combination of claim 14 wherein the coeficient of static friction provided by the raised portions is substantially the same in both direction along the first passage.

18. The combination of claim 14 wherein the first strap cover is adapted to be folded along a fold line.

19. The combination of claim 18 wherein the first strap cover further inlcudes a plurality of connector pairs with one connector in each pair disposed a similar distance from, and on opposite sides of, the fold line.

20. The combination of claim 14 wherein the width of the first passage is between approximately 70 and 97 percent of the nominal width of the seat belt.

21. The combination of claim 14 wherein the first and second strap covers are releasably coupled together, with the first strap cover positioned about a shoulder strap of the seat belt and the second strap cover positioned about a lap belt of the seat belt, to position the shoulder strap away from the neck of a child secured by the seat belt.

22. The combination of claim14 wherein the first and second strap covers are of identical structure.

23. A method of covering and positioning portions of a seat belt, the method comprising securing a first strap cover about a first portion of the seat belt received in a first passage provided by the cover, the passage having a width that is smaller than the nominal width of the seat belt, at least a portion of the cover that is adapted to be disposed over an edge of the seat belt having a soft exterior surface, the cover including at least one pair of connectors adapted to selectively connect portions of the cover to enclose the first portion of the seat belt;

securing a second strap cover about a second portion of the seat belt received in a second passage provided by the second cover, at least a portion of the second cover having a soft exterior surface; and releasably coupling the first and second strap covers to each other to relatively position their respective seat belt portions.

24. The method of claim 23 wherein the passage of the first strap cover has a surface adapted to substantially prevent the first strap cover from sliding relative to the seat belt when the surface is pressed against the seat belt.

25. The method of claim 23 wherein the first passage is defined by s surface of the first strap cover that includes a plurality of raised portions adapted to provide a high coefficient friction.

26. The method of claim 25 wherein the cofficient of static friction provided by the raised portions is substantially the same in both directions along the first passage.

27. The method of claim 23 wherein the first strap cover is adapted to be folded along a fold line.

28. The method of claim 27 wherein the first strap cover further includes a plurality of connector pairs with one connector in eaach pair disposed a similar distance from, and on opposite sides of, the fold line, and wherein securing the first strap cover about a first portion of the seat belt comprises connecting the connector pairs about the first portion of the seat belt.

29. The method of claim 23 wherein the width of the first passage is between approximately 70 and 97 percent of the nominal width of the seat belt.

30. The method of claim 23 wherein the first and second strap covers are releasably coupled together with the first strap cover positioned about a shoulder strap of the seat belt and the second strap cover positioned about a lap belt of the seat belt, thereby positioning the shoulder strap away from the neck of a child secured by the seat belt.

31. The method of claim 23 wherein the first and second strap cover are of indentical structure.

32. An apparatus comprising:

a first strap cover adapted to receive a first section of a seat belt strap through a first passage provided by the cover, the passage having a width selected to be between approximately 70 and 97 percent of a width of a seat belt strap, at least a portion of the cover that is adapted to be disposed over an edge of the strap having a soft exterior surface, the cover including at least one pair of connectors adapted to selectively connect portions of the cover to enclose a first section of the seat belt; and a second strap cover adapted to receive a second section of the seat belt strap through a second passage provided by the second cover, at least a portion of the second cover having a soft exterior surface;

the first and second strap covers having connectors for releasably coupling the strap covers to each other to relatively position their seat belt strap sections.

\* \* \* \* \*

UNITED STATES PATENT AND TRADEMARK OFFICE
CERTIFICATE OF CORRECTION

PATENT NO. : 6,322,149 B1
DATED : November 27, 2001
INVENTOR(S) : Carl J. Conforti and Alma Bair It is certified that error appears in the above-identified patent and that said Letters Patent is hereby corrected as shown below:

Title page,
Item [56], References Cited, 5,573,306 reference delete "11/1996", insert
-- 11/1986 --.
2,169,187 reference delete "7/1996" insert -- 7/1986 --.

Column 6,
Line 47, "reletively" should be -- relatively --.
Line 58, add -- s -- to "direction".

Column 7,
Line 33, delete "s" insert -- a -- before "surface".
Line 35, add -- of static -- after "coefficient".

Signed and Sealed this

Twenty-ninth Day of October, 2002

Attest:

Attesting Officer

JAMES E. ROGAN
Director of the United States Patent and Trademark Office